United States Patent
Yan et al.

(10) Patent No.: US 12,487,160 B2
(45) Date of Patent: Dec. 2, 2025

(54) SURFACE DENSITY MEASUREMENT METHOD, SURFACE DENSITY MEASUREMENT SYSTEM, AND COMPUTER DEVICE

(71) Applicant: CONTEMPORARY AMPEREX TECHNOLOGY (HONG KONG) LIMITED, Hong Kong (CN)

(72) Inventors: Liangjie Yan, Ningde (CN); Qian Wu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 179 days.

(21) Appl. No.: 18/479,929

(22) Filed: Oct. 3, 2023

(65) Prior Publication Data
US 2024/0077397 A1 Mar. 7, 2024

Related U.S. Application Data

(63) Continuation of application No. PCT/CN2023/092542, filed on May 6, 2023.

(30) Foreign Application Priority Data

Sep. 2, 2022 (CN) .......................... 202211069810.3

(51) Int. Cl.
G01N 9/24 (2006.01)
H01M 4/04 (2006.01)

(52) U.S. Cl.
CPC ............... *G01N 9/24* (2013.01); *H01M 4/04* (2013.01)

(58) Field of Classification Search
CPC ... G01N 9/24; G01N 2203/0282; H01M 4/04; Y02E 60/10
See application file for complete search history.

(56) References Cited

U.S. PATENT DOCUMENTS

| 2014/0295068 A1* | 10/2014 | Nanba .................. H01M 4/139 427/122 |
| 2021/0104719 A1* | 4/2021 | Oikawa ............... H01M 4/0471 |

(Continued)

FOREIGN PATENT DOCUMENTS

| CN | 102967529 A | 3/2013 |
| CN | 102967529 B | 4/2015 |

(Continued)

OTHER PUBLICATIONS

The World Intellectual Property Organization (WIPO) International Search Report for PCT/CN2023/092542 Aug. 14, 2023 5 pages (Including English translation).

(Continued)

*Primary Examiner* — Michelle M Iacoletti
*Assistant Examiner* — Maher Yazback
(74) *Attorney, Agent, or Firm* — ANOVA LAW GROUP, PLLC

(57) ABSTRACT

A surface density measurement method includes: obtaining a single-sided-electrode-plate transverse scan result by performing a ray source-based transverse scan on a single-sided electrode plate, where the single-sided-electrode-plate transverse scan result includes a blank zone scan result of a blank zone of the single-sided electrode plate and a single-side coating zone scan result of the single-sided electrode plate; obtaining a double-sided-electrode-plate transverse scan result by performing a ray source-based transverse scan on a double-sided electrode plate, where the double-sided electrode plate is an electrode plate obtained by coating the single-sided electrode plate, and the double-sided-electrode-plate transverse scan result includes a double-side coating zone scan result of the double-sided electrode plate; and obtaining surface densities of the electrode plate by analyz- (Continued)

ing the single-sided-electrode-plate transverse scan result and the double-sided-electrode-plate transverse scan result.

13 Claims, 4 Drawing Sheets

(56) References Cited

U.S. PATENT DOCUMENTS

| | | | | |
|---|---|---|---|---|
| 2021/0244374 A1* | 8/2021 | Zhao | ................... | A61B 6/4241 |
| 2024/0021830 A1* | 1/2024 | Kim | ........................ | H01M 4/02 |
| 2024/0339584 A1* | 10/2024 | Jang | .................... | H01M 4/0471 |
| 2025/0006984 A1* | 1/2025 | Visco | .................. | H01M 50/437 |

FOREIGN PATENT DOCUMENTS

| | | | |
|---|---|---|---|
| CN | 110108239 A | 8/2019 |
| CN | 111103213 A | 5/2020 |
| CN | 112082901 A | 12/2020 |
| CN | 114720324 A | 7/2022 |
| CN | 115463764 A | 12/2022 |
| CN | 115839902 A | 3/2023 |
| JP | 2006090892 A | 4/2006 |
| JP | 2007173114 A | 7/2007 |
| JP | 2011196755 A | 10/2011 |

OTHER PUBLICATIONS

The European Patent Office (EPO) Extended Search Report for EP Application No. 23782129.3. Aug. 21, 2024 10 Pages.
State Intellectual Property Office of China The First Office Action for Application No. 202211069810.3 Jun. 10, 2025 14 pages (including translation).

* cited by examiner

SURFACE DENSITY MEASUREMENT METHOD, SURFACE DENSITY MEASUREMENT SYSTEM, AND COMPUTER DEVICE

CROSS-REFERENCE TO RELATED APPLICATIONS

This application is a continuation of International Application No. PCT/CN2023/092542, filed on May 6, 2023, which claims priority to Chinese Patent Application No. 2022110698103, filed on Sep. 2, 2022 and entitled "SURFACE DENSITY MEASUREMENT METHOD, SURFACE DENSITY MEASUREMENT SYSTEM, AND COMPUTER DEVICE", which are incorporated herein by reference in their entirety.

TECHNICAL FIELD

This application relates to the field of battery measurement technologies, and in particular, to a surface density measurement method, a surface density measurement system, a surface density measurement apparatus, a computer device, a computer-readable storage medium, and a computer program product.

BACKGROUND

In the field of battery technologies, in the production process of batteries such as lithium batteries, surface densities of single-side and double-side coatings are usually measured for electrode plates of dry film lithium batteries to prevent bulk scrap caused by over-specified lithium precipitation of lithium batteries. In the traditional surface density measurement process of single-side and double-side coatings of batteries, a surface density measurement system composed of multiple rack scanners is used to measure surface densities of an electrode plate. The surface density measurement system includes three rack scanners. The first rack scanner obtains a surface density of an uncoated substrate through scanning, the second rack scanner obtains a surface density of an electrode plate coated on a single side (substrate+side A coating, hereinafter referred to as a single-sided electrode plate) through scanning, and the third rack scanner obtains a surface density of an electrode plate coated on two sides (substrate+side A coating+side B coating, hereinafter referred to as a double-sided electrode plate) through scanning. A surface density of the side A coating and a surface density of the side B coating are calculated by using the surface densities obtained by the multiple rack scanners.

However, the inventors of this application have found that the measurement accuracy of surface densities obtained from such a surface density measurement manner is low.

SUMMARY

In view of this, it is needed to provide one or more of a surface density measurement method with high measurement accuracy, a surface density measurement system, a surface density measurement apparatus, a computer device, a computer-readable storage medium, and a computer program product to solve the above technical problems.

According to a first aspect, this application provides a surface density measurement method. The method includes:
obtaining a single-sided-electrode-plate transverse scan result by performing a ray source-based transverse scan on a single-sided electrode plate, where the single-sided-electrode-plate transverse scan result includes a blank zone scan result of a blank zone of the single-sided electrode plate and a single-side coating zone scan result of the single-sided electrode plate;
obtaining a double-sided-electrode-plate transverse scan result by performing a ray source-based transverse scan on a double-sided electrode plate, where the double-sided electrode plate is an electrode plate obtained by coating the single-sided electrode plate, and the double-sided-electrode-plate transverse scan result includes a double-side coating zone scan result of the double-sided electrode plate; and
obtaining surface densities of the electrode plate by analyzing the single-sided-electrode-plate transverse scan result and the double-sided-electrode-plate transverse scan result.

According to the method in this embodiment of this application, only a transverse scan needs to be performed on the single-sided electrode plate and the double-sided electrode plate. The single-sided-electrode-plate transverse scan result obtained in the transverse scan performed on the single-sided electrode plate includes the blank zone scan result of the blank zone of the single-sided electrode plate and the single-side coating zone scan result of the single-sided electrode plate; and the double-sided-electrode-plate transverse scan result obtained in the transverse scan performed on the double-sided electrode plate includes the double-side coating zone scan result of the double-sided electrode plate; so that the surface densities of the electrode plate are obtained by analyzing the single-sided-electrode-plate transverse scan result and the double-sided-electrode-plate transverse scan result. In other words, the surface density measurement results can be obtained from two transverse scans. This reduces the costs, reduces the influence of the difference between the environment of uncoated substrates and the environment of coated single-sided electrode plates on the measurement accuracy, and reduces the influence of the same-point accuracy difference among the three rack scanners (for example, same-trajectory scan, scanning distance, transverse scan position, and the like) on the measurement accuracy, thereby improving the accuracy of obtained surface density measurement results.

In some embodiments, the single-sided-electrode-plate transverse scan result is a result obtained by performing the transverse scan on the single-sided electrode plate dried, and the double-sided-electrode-plate transverse scan result is a result obtained by performing the transverse scan on the double-sided electrode plate dried.

After the single-sided electrode plate and the double-sided electrode plate are dried, the transverse scan is performed to obtain the corresponding single-sided-electrode-plate transverse scan result and the double-sided-electrode-plate transverse scan result, and the single-sided electrode plate and the double-sided electrode plate are dried in substantially the same environment, for example, humidity and temperature, thereby ensuring that the obtained single-sided-electrode-plate transverse scan result and the double-sided-electrode-plate transverse scan result are meant for similar environments. This further reduces the influence of the environment difference between coated single-sided electrode plates and coated double-sided electrode plates on the measurement accuracy and further improves the accuracy of obtained surface density measurement results.

In some embodiments, the single-sided-electrode-plate transverse scan result is a result obtained by performing the transverse scan on the single-sided electrode plate by using a narrow spot ray source, and the double-sided-electrode-plate transverse scan result is a result obtained by performing the transverse scan on the double-sided electrode plate by using a narrow spot ray source.

The transverse scan is performed on the single-sided electrode plate and the double-sided electrode plate by using the narrow spot ray source. Because the narrow spot ray source has a higher transverse resolution, the transverse scan result obtained by a rack scanner during the transverse scan also has a higher resolution in a transverse direction, and therefore, the surface density determined based on the result is more accurate, further improving the accuracy of obtained surface density measurement results.

In some embodiments, a width of the narrow spot ray source is smaller than a tab width of a tab of the electrode plate.

With the width of the narrow spot ray source set to be smaller than the tab width of the tab of the electrode plate, it is possible for an entire light spot of the narrow spot ray source to fall within the range of the very narrow tab. The tab can be essentially considered as a blank zone of the electrode plate because the tab is not coated, and therefore, more energy of the ray source can be detected in the blank zone and a coating zone of the electrode plate. With the higher resolution, true edge contours of substrates and coatings can be better identified.

In some embodiments, the method further includes: obtaining, by analyzing the single-sided-electrode-plate transverse scan result and the double-sided-electrode-plate transverse scan result, an identification result of whether the single-sided electrode plate and/or double-sided electrode plate has a surface anomaly.

Since the transverse scan is performed on the single-sided electrode plate and the double-sided electrode plate by using the narrow spot ray source and the narrow spot ray source has a higher transverse resolution, it is possible to accordingly identify whether the single-sided electrode plate and/or double-sided electrode plate has a surface anomaly, and thus the quality of the electrode plate obtained can be improved accordingly.

In some embodiments, the obtaining a single-sided-electrode-plate transverse scan result by performing a ray source-based transverse scan on a single-sided electrode plate includes:

obtaining a first scan result by performing the ray source-based transverse scan on the single-sided electrode plate;

analyzing the first scan result to identify a single-sided-electrode-plate blank zone width of a blank zone of the single-sided electrode plate and a single-side coating zone width of the single-sided electrode plate; and obtaining the single-sided-electrode-plate transverse scan result based on the first scan result, the single-sided-electrode-plate blank zone width, and the single-side coating zone width.

After the first scan result is obtained by performing the ray source-based transverse scan on the single-sided electrode plate, the single-sided-electrode-plate blank zone width of the blank zone and the single-side coating zone width of the single-sided electrode plate are identified, and then based on the single-sided-electrode-plate blank zone width and single-side coating zone width identified, the specific blank zone scan result of the blank zone and the specific single-side coating zone scan result of the single-sided electrode plate can be obtained. In the case of performing the transverse scan on the single-sided electrode plate by using the narrow spot ray source, the higher transverse resolution of the narrow spot ray source can improve the capability of identifying true edge contours of substrates and coatings so that single-sided-electrode-plate blank zone widths and single-side coating zone widths identified are more accurate, thereby making the blank zone scan result of the blank zone and the single-side coating zone scan result of the single-sided electrode plate obtained accordingly also more accurate.

In some embodiments, the obtaining a double-sided-electrode-plate transverse scan result by performing a ray source-based transverse scan on a double-sided electrode plate includes:

obtaining a second scan result by performing the ray source-based transverse scan on the double-sided electrode plate;

analyzing the second scan result to identify a double-sided-electrode-plate blank zone width of a blank zone of the double-sided electrode plate and a double-side coating zone width of the double-sided electrode plate; and obtaining the double-sided-electrode-plate transverse scan result based on the second scan result, the double-sided-electrode-plate blank zone width, and the double-side coating zone width.

After the second scan result is obtained by performing the ray source-based transverse scan on the double-sided electrode plate, the double-sided-electrode-plate blank zone width of the blank zone and the double-side coating zone width of the double-sided electrode plate are identified, and then based on the double-sided-electrode-plate blank zone width and double-side coating zone width identified, the specific blank zone scan result of the blank zone and the specific double-side coating zone scan result of the double-sided electrode plate can be obtained. In the case of performing the transverse scan on the double-sided electrode plate by using the narrow spot ray source, the higher transverse resolution of the narrow spot ray source can improve the capability of identifying true edge contours of substrates and coatings so that double-sided-electrode-plate blank zone widths and double-side coating zone widths identified are more accurate, thereby making the blank zone scan result of the blank zone and the double-side coating zone scan result of the double-sided electrode plate obtained accordingly also more accurate.

In some embodiments, obtaining surface density measurement results of the electrode plate by analyzing the single-sided-electrode-plate transverse scan result and the double-sided-electrode-plate transverse scan result includes:

obtaining a substrate surface density and first-side coating surface density of the electrode plate by analyzing the single-sided-electrode-plate transverse scan result; and obtaining a second-side coating surface density of the electrode plate by analyzing the single-sided-electrode-plate transverse scan result and the double-sided-electrode-plate transverse scan result.

The substrate surface density and first-side coating surface density of the electrode plate can be obtained from the single-sided-electrode-plate transverse scan result; and the second-side coating surface density of the electrode plate can be obtained with reference to the single-sided-electrode-plate transverse scan result and the double-sided-electrode-plate transverse scan result, so that the surface densities of the substrate, a first surface coating, and a second surface coating of the electrode plate are determined.

In some embodiments, the blank zone scan result of the blank zone of the single-sided electrode plate includes a blank zone ray absorption rate of the blank zone of the single-sided electrode plate, and the single-side coating zone scan result of the single-sided electrode plate includes a single-side coating zone ray absorption rate of the single-sided electrode plate; and the obtaining a substrate surface density and first-side coating surface density of the single-sided electrode plate by analyzing the single-sided-electrode-plate transverse scan result includes:

obtaining a first-side coating ray absorption rate based on the blank zone ray absorption rate and the single-side coating zone ray absorption rate, and obtaining the first-side coating surface density based on the first-side coating ray absorption rate through conversion.

The first-side coating surface density can be obtained based on the obtained blank zone ray absorption rate of the blank zone of the single-sided electrode plate, the single-side coating zone ray absorption rate of the single-sided electrode plate, and conversion relations between absorption rates and surface densities.

In some embodiments, the double-side coating zone scan result includes a double-side coating zone ray absorption rate of the double-sided electrode plate; and the obtaining a second-side coating surface density of the double-sided electrode plate by analyzing the single-sided-electrode-plate transverse scan result and the double-sided-electrode-plate transverse scan result includes:

obtaining a second-side coating ray absorption rate based on the single-side coating zone ray absorption rate and the double-side coating zone ray absorption rate, and obtaining the second-side coating surface density based on the second-side coating ray absorption rate through conversion.

The second-side coating surface density can be obtained based on the obtained double-side coating zone ray absorption rate of the double-sided electrode plate and conversion relations between absorption rates and surface densities.

According to a second aspect, an embodiment of this application provides a surface density measurement system. The system includes two rack scanners, one of the rack scanners is disposed at a position through which a single-sided electrode plate passes, the other of the rack scanners is disposed at a position through which a double-sided electrode plate passes, the double-sided electrode plate is an electrode plate obtained by coating the single-sided electrode plate, each of the rack scanners performs a transverse scan on a blank zone and a coated zone of the electrode plate passing through the rack scanner, and surface densities of the electrode plate is obtained based on the transverse scan results of the two rack scanners.

In some embodiments, one of the rack scanners is disposed at a position through which the single-sided electrode plate dried passes, and the other of the rack scanners is disposed at a position through which the double-sided electrode plate dried passes.

In some embodiments, a ray source of the rack scanner is a narrow spot ray source.

In some embodiments, a width of the narrow spot ray source is smaller than a tab width of a tab of the electrode plate.

According to a third aspect, this application provides a surface density measurement apparatus. The apparatus includes:

a scan result obtaining module configured to obtain a single-sided-electrode-plate transverse scan result by performing a ray source-based transverse scan on a single-sided electrode plate, where the single-sided-electrode-plate transverse scan result includes a blank zone scan result of a blank zone of the single-sided electrode plate and a single-side coating zone scan result of the single-sided electrode plate; and obtain a double-sided-electrode-plate transverse scan result by performing a ray source-based transverse scan on a double-sided electrode plate, where the double-sided electrode plate is an electrode plate obtained by coating the single-sided electrode plate, and the double-sided-electrode-plate transverse scan result includes a double-side coating zone scan result of the double-sided electrode plate; and an analysis module configured to obtain surface densities of the electrode plate by analyzing the single-sided-electrode-plate transverse scan result and the double-sided-electrode-plate transverse scan result.

In some embodiments, the single-sided-electrode-plate transverse scan result is a result obtained by performing the transverse scan on the single-sided electrode plate dried, and the double-sided-electrode-plate transverse scan result is a result obtained by performing the transverse scan on the double-sided electrode plate dried.

In some embodiments, the single-sided-electrode-plate transverse scan result is a result obtained by performing the transverse scan on the single-sided electrode plate by using a narrow spot ray source, and the double-sided-electrode-plate transverse scan result is a result obtained by performing the transverse scan on the double-sided electrode plate by using a narrow spot ray source.

In some embodiments, a width of the narrow spot ray source is smaller than a tab width of a tab of the electrode plate.

In some embodiments, the analysis module is further configured to obtain, by analyzing the single-sided-electrode-plate transverse scan result and the double-sided-electrode-plate transverse scan result, an identification result of whether the single-sided electrode plate and/or double-sided electrode plate has a surface anomaly.

In some embodiments, the scan result obtaining module is configured to obtain a first scan result by performing a ray source-based transverse scan on the single-sided electrode plate; analyze the first scan result to identify a single-sided-electrode-plate blank zone width of a blank zone of the single-sided electrode plate and a single-side coating zone width of the single-sided electrode plate; and obtain the single-sided-electrode-plate transverse scan result based on the first scan result, the single-sided-electrode-plate blank zone width, and the single-side coating zone width.

In some embodiments, the scan result obtaining module is configured to obtain a second scan result by performing a ray source-based transverse scan on the double-sided electrode plate; analyze the second scan result to identify a double-sided-electrode-plate blank zone width of a blank zone of the double-sided electrode plate and a double-side coating zone width of the double-sided electrode plate; and obtain the double-sided-electrode-plate transverse scan result based on the second scan result, the double-sided-electrode-plate blank zone width, and the double-side coating zone width.

According to a fourth aspect, this application provides a computer device including a processor and a memory, the memory storing a computer program, where when executed by the processor, the computer program enables the processor to implement the steps of the method according to any one of the foregoing embodiments.

According to a fifth aspect, this application provides a computer-readable storage medium storing a computer program, where when executed by a processor, the computer program enables the processor to implement the steps of the method according to any one of the foregoing embodiments.

According to a sixth aspect, this application provides a computer program product including a computer program, where when the computer program is executed by a processor, the steps of the method according to any one of the foregoing embodiments are implemented.

The foregoing description is merely an overview of the technical solution of this application. For a better understanding of the technical means in this application such that they can be implemented according to the content of the specification, and to make the above and other objectives, features, and advantages of this application more obvious and easier to understand, the following describes specific embodiments of this application.

BRIEF DESCRIPTION OF DRAWINGS

Other advantages and benefits will become apparent to those of ordinary skill in the art by reading the following detailed descriptions of optional embodiments. The accompanying drawings are merely intended to illustrate optional embodiments and are not interpreted as limiting this application. In addition, in all the accompanying drawings, same parts are denoted by same reference signs. In the accompanying drawings.

Figure 1:
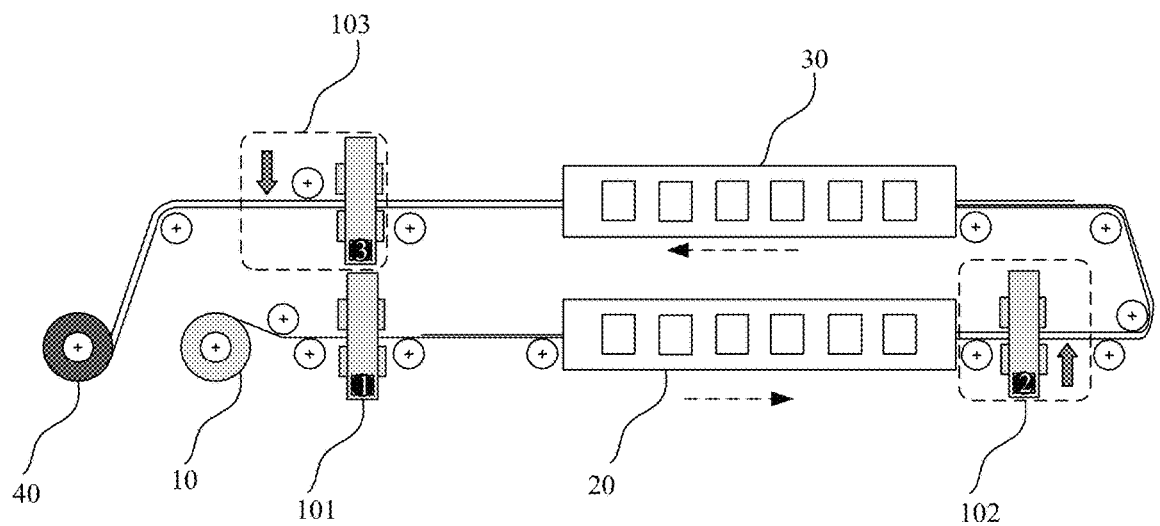
FIG. 1 is a schematic diagram of a surface density measurement system and an application environment thereof.

Reference signs in specific embodiments are as follows:
substrate 10;
drying devices 20, 30;
sheet roll 40;
rack scanners 101, 102, 103, 201, 202;
tab 301;
coated zone 302;
blank zone 303;
circular light spot 310; and
narrow light spot 320.

DESCRIPTION OF EMBODIMENTS

The following describes in detail the embodiments of technical solutions of this application with reference to the accompanying drawings. The following embodiments are merely intended for a clearer description of the technical solutions of this application and therefore, are used as just examples which do not constitute any limitations on the protection scope of this application.

Unless otherwise defined, all technical and scientific terms used herein shall have the same meanings as commonly understood by those skilled in the art to which this application belongs. The terms used herein are merely intended to describe the specific embodiments but not intended to constitute any limitation on this application. The terms "include", "comprise", and "having" and any other variations thereof in the specification, the claims and the foregoing brief description of drawings of this application are intended to cover a non-exclusive inclusion.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

In the description of the embodiments of this application, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this application, the term "multiple" means more than two (inclusive). Similarly, "multiple groups" means more than two (inclusive) groups, and "multiple pieces" means more than two (inclusive) pieces.

In the description of the embodiments of this application, the orientations or positional relationships indicated by the technical terms "center", "longitudinal" "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of the description of the embodiments of this application rather than indicating or implying that the apparatuses or components mentioned must have specific orientations, or must be constructed or manipulated according to specific orientations, and therefore, shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skill in the art can understand specific meanings of these terms in the embodiments of this application as appropriate to specific situations.

Currently, from the perspective of market development, application of traction batteries is being more extensive. Traction batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, military equipment, and aerospace. With continuous expansion of application fields of traction batteries, market demands for the traction batteries are al so expanding.

In the field of battery technologies, in the production process of batteries such as lithium batteries, surface densities of single-side and double-side coatings are usually measured for electrode plates of dry film lithium batteries. In the traditional surface density measurement process of batteries, a surface density measurement system composed of multiple rack scanners is used to measure surface densities of an electrode plate. Refer to FIG. 1. The surface density measurement system typically includes three rack scanners 101, 102, and 103. The first rack scanner 101 obtains a surface density of an uncoated substrate 10 through scanning, the second rack scanner 102 obtains a surface density of an electrode plate coated on a single side (substrate+side A coating, hereinafter referred to as a single-sided electrode plate) through scanning, and the third rack scanner 103 obtains a surface density of an electrode plate coated on two sides (substrate+side A coating+side B coating, hereinafter referred to as a double-sided electrode plate) through scanning. During moving of the substrate 10 towards a coater, such as moving along a direction shown by a dashed arrow in the figure, the rack scanner 101 first scans the substrate 10 uncoated to obtain a substrate scan result, the substrate 10 is coated on one side to obtain a single-sided electrode plate, the single-sided electrode plate is dried by a drying device 20 and then passes through the rack scanner 102, and the rack scanner 102 performs a ray scan on the single-sided electrode plate to obtain a scan result of the single-sided electrode plate. The other side of the single-sided electrode plate dried is coated to obtain a double-sided electrode plate, the double-sided electrode plate is dried by a drying device 30 and then passes through the rack scanner 103, and the rack scanner 103 performs a ray scan on the double-sided electrode plate to obtain a scan result of the double-sided electrode plate. The double-sided electrode plate dried further moves in the coater to obtain a sheet roll 40.

Based on the substrate scan result, the scan result of the single-sided electrode plate, and the scan result of the double-sided electrode plate, surface densities of the substrate and two coatings on two sides of the substrate can be obtained through calculation. For example, a surface density of the substrate can be obtained based on the substrate scan result. A surface density of the substrate+single-side coating (for example, side A coating) can be obtained based on the scan result of the single-sided electrode plate. A surface density of the side A coating can be obtained through subtraction of the former two densities. A surface density of the substrate+double-side coating (for example, side A coating+side B coating) can be obtained based on the scan result of the double-sided electrode plate. A surface density of the side B coating can be obtained by subtracting the surface density of the substrate+single-side coating from the surface density of the substrate+double-side coating.

The inventors of this application have noted that when the substrate scan result is obtained, the substrate is in a room temperature environment, and when the scan result of the single-sided electrode plate and the scan result of the double-sided electrode plate are obtained, scan is usually performed on the single-sided electrode plate dried and the double-sided electrode plate dried, in other words, the electrode plates are in a drying environment or an environment close to a drying environment. However, the drying environment or the environment close to a drying environment is quite different from the room temperature environment for the substrate. For example, temperatures, humidities, and the like are different. Moreover, online separate monitoring of the side A and B coatings needs to be implemented through same point scan and deduction of a net substrate weight. A same point accuracy difference needs to be <±5 millimeters (mm) in high speed scan, but there is a measurement accuracy lag for same point deduction in a case of multiple scanners due to the ambient temperature, tension change, scanning distance, and the like. For example, the tension in the coating production of lithium batteries varies within ±3 Newtons (N), the scanning distance at a roll unwinding end cannot be monitored and compensated in real-time due to error correction and tension change. As shown in FIG. 1, when the electrode plate 10 reaches the zone of the rack scanner 101, and reaches the rack scanner 102 after passing through the drying device 20, under the influence of a coating belt on the tension of the electrode plate, tensions of the electrode plate 10 at the rack scanner 101 and the rack scanner 102 are different and accurate synchronization cannot be implemented. All these aspects affect the accuracy of surface density measurement. Furthermore, using three rack scanners to scan the electrode plates means large space occupation and high costs.

In view of the foregoing considerations, to improve the accuracy of surface density measurement, the inventors have provided a surface density measurement system after thorough research. The system measures surface densities of an electrode plate through two rack scanners. One of the rack scanners scans a single-sided electrode plate to obtain both scan results of a blank zone and a coated zone of the single-sided electrode plate. In other words, a single rack scanner can obtain both the scan results of the blank zone and the coated zone of the single-sided electrode plate, and a surface density is determined on this basis. This solves the problem that in a case of multiple-rack-scanner measurement, the accuracy is affected by different environments such as temperatures and humidities, and different stresses between substrates and single-sided electrode plates.

Figure 2:
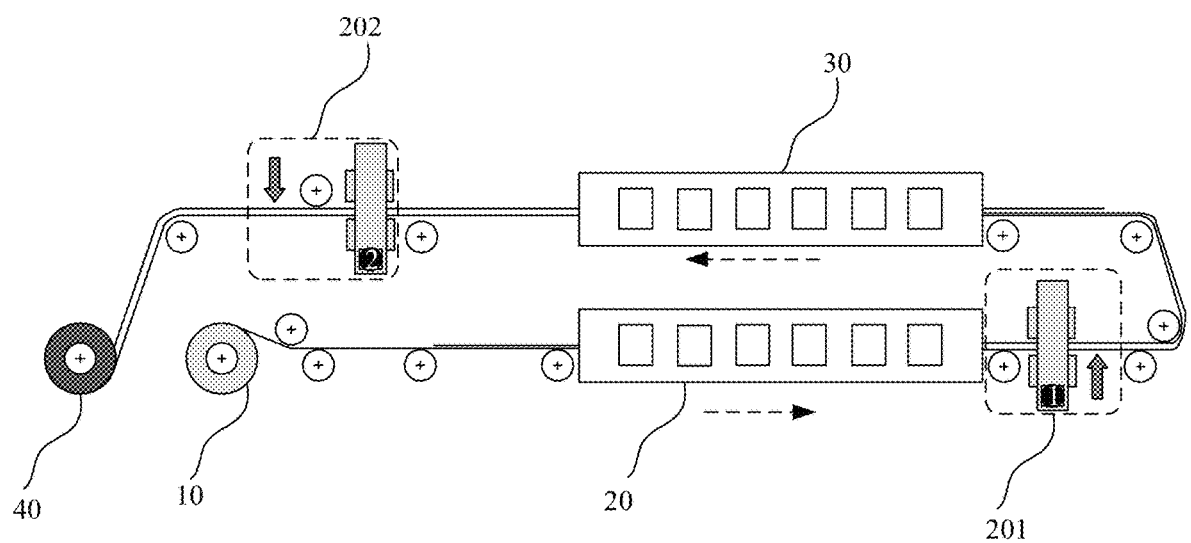
FIG. 2 is a schematic diagram of a surface density measurement system and an application environment thereof according to some embodiments of this application.

Refer to FIG. 2. An embodiment of this application provides a surface density measurement system. The system includes two rack scanners 201, 202, and the rack scanner 201 is disposed at a location through which a single-sided electrode plate passes, and the rack scanner 202 is disposed at a location through which a double-sided electrode plate passes. The double-sided electrode plate is an electrode plate obtained by coating an uncoated side of the single-sided electrode plate, and each rack scanner 201, 202 performs a transverse scan on a blank zone and a coated zone of the electrode plate passing through the rack scanner 201, 202 to obtain a transverse scan result, and surface densities of the electrode plate are obtained based on the transverse scan results of the two rack scanners 201, 202.

The blank zone of the electrode plate is an uncoated zone on the electrode plate, and the coated zone is a zone on the electrode plate coated with a coating. Since coating is applied to the electrode plate at intervals, in other words, there is an uncoated zone between two adjacent coated zones. In this embodiment of this application, a zone on the electrode plate coated with a coating is referred to as a coated zone. Refer to a partial coated electrode plate in FIG. 3. Zones 302 on the electrode plate are coated with a coating and referred to as coated zones in this embodiment of this application, and blank zones 303 not coated with a coating are present among the coated zones. A tab zone 301 is located at an edge part of the electrode plate. The tab zone 301 is not coated either, and therefore, is also a blank zone in this embodiment of this application. In other words, in this embodiment of this application, the blank zone includes tab zone and zone between two adjacent coated zones.

The transverse scan is a back and forth scan at an angle (for example, in a perpendicular direction) to a moving direction of the electrode plate. On a coater, the electrode plate moves along a length direction of the coated zone, and for example, moves up and down with reference to the partial electrode plate in FIG. 3. In this case, the transverse scan moves at an angle such as an angle of 90 degrees to the length direction of the coated zone, and moves left and right in FIG. 3, so that the rack scanner can scan both the blank zone and the coated zone in one scan cycle.

Based on this surface density measurement system, during moving of a substrate 10 towards the coater, the substrate 10 is coated on one side to obtain the single-sided electrode plate, and passes through the rack scanner 201 after being dried by a drying device 20. The rack scanner 201 performs a ray scan on the single-sided electrode plate (including performing a transverse scan on the blank zone and the coated zone of the single-sided electrode plate), and then the other side of the single-sided electrode plate dried is coated to obtain the double-sided electrode plate, and the double-sided electrode plate passes through the rack scanner 202 after being dried by a drying device 30. The rack scanner 202 performs a ray scan on the double-sided electrode plate (including performing a transverse scan on the blank zone and the coated zone of the double-sided electrode plate), and the surface densities of the electrode plate are obtained through measurement based on the transverse scan results of the two rack scanners 201, 202.

Surface densities of the substrate and the two coatings on two sides of the substrate can be obtained through calculation based on the transverse scan results of the two rack scanners 201, 202. For example, based on the scan result obtained by the rack scanners 201 by performing the transverse scan on the blank zone and the coated zone of the single-sided electrode plate, the substrate surface density of the substrate and a surface density of a single-side coating (for example, side A coating) of the substrate (referred to as a first-side coating surface density in the following embodiments) can be obtained. By using the scan result obtained by the rack scanners 201 by performing the transverse scan on the blank zone and the coated zone of the single-sided electrode plate and the scan result obtained by the rack scanners 202 by performing the transverse scan on the blank zones and the coated zones of the double-sided electrode plate, a surface density of the other-side coating (for example, the side B coating) of the substrate (referred to as a second-side coating surface density in the following embodiments) can be obtained.

According to some embodiments of this application, optionally, the scan result obtained by the rack scanner 201 by performing the transverse scan on the blank zone and the coated zone of the single-sided electrode plate (also referred to as a single-sided-electrode-plate transverse scan result in the embodiments of this application) may include a blank zone scan result of a blank zone of the single-sided electrode plate and a single-side coating zone scan result of the single-sided electrode plate.

According to some embodiments of this application, optionally, it may be that after the rack scanner 201 performs the transverse scan on the single-sided electrode plate to obtain a first scan result, the first scan result is analyzed to identify a single-sided-electrode-plate blank zone width of a blank zone of the single-sided electrode plate and a single-side coating zone width of the single-sided electrode plate, and the single-sided-electrode-plate transverse scan result is obtained based on the first scan result, the single-sided-electrode-plate blank zone width, and the single-side coating zone width.

According to some embodiments of this application, optionally, the blank zone scan result of the blank zone of the single-sided electrode plate includes a blank zone ray absorption rate of the blank zone of the single-sided electrode plate, and the single-side coating zone scan result of the single-sided electrode plate includes a single-side coating zone ray absorption rate of the single-sided electrode plate.

In this case, in some embodiments, the substrate surface density can be obtained through conversion based on the blank zone ray absorption rate of the blank zone of the single-sided electrode plate, and a first-side coating ray absorption rate can be obtained based on the blank zone ray absorption rate and the single-side coating zone ray absorption rate. For example, a difference between the blank zone ray absorption rate and the single-side coating zone ray absorption rate is used as the first-side coating ray absorption rate, and the first-side coating surface density is obtained through conversion based on the first-side coating ray absorption rate.

In some other embodiments, the substrate surface density can be obtained through conversion based on the blank zone ray absorption rate of the blank zone of the single-sided electrode plate, a single-side coating zone density is obtained through conversion based on the single-side coating zone ray absorption rate, and a difference between the single-side coating zone density and the substrate surface density is used as the first-side coating surface density.

According to some embodiments of this application, optionally, the scan result obtained by the rack scanner 202 by performing the transverse scan on the double-sided electrode plate (also referred to as a double-sided-electrode-plate transverse scan result in the embodiments of this application) may include a double-side coating zone scan result of the double-sided electrode plate. It should be understood that in some embodiments, the scan result may also include a blank zone scan result of a blank zone of the double-sided electrode plate.

According to some embodiments of this application, optionally, it may be that after the rack scanner 202 performs the transverse scan on the double-sided electrode plate to obtain a second scan result, the second scan result is analyzed to identify a double-sided-electrode-plate blank zone width of a blank zone of the double-sided electrode plate and a double-side coating zone width of the double-sided electrode plate, and the double-sided-electrode-plate transverse scan result is obtained based on the second scan result, the double-sided-electrode-plate blank zone width, and the double-side coating zone width.

In some embodiments, the double-side coating zone scan result of the double-sided electrode plate includes a double-side coating zone ray absorption rate of the double-sided electrode plate. The blank zone scan result of the blank zone of the double-sided electrode plate may include a blank zone ray absorption rate of the blank zone of the double-sided electrode plate.

In this case, in some embodiments, a second-side coating ray absorption rate can be obtained based on the double-side coating zone ray absorption rate and the foregoing single-side coating zone ray absorption rate. For example, a difference between the double-side coating zone ray absorption rate and the single-side coating zone ray absorption rate is used as the second-side coating ray absorption rate, and the second-side coating surface density is obtained through conversion based on the second-side coating ray absorption rate.

In some other embodiments, a double-side coating zone density can be obtained through conversion based on the double-side coating zone ray absorption rate, and a difference between the double-side coating zone density and the single-side coating zone density is used as the second-side coating surface density.

In some other embodiments, a substrate surface density of the blank zone of the double-sided electrode plate can be obtained through conversion based on the blank zone ray absorption rate of the blank zone of the double-sided electrode plate, and a double-side coating ray absorption rate of the electrode plate can be obtained based on the blank zone ray absorption rate and double-side coating zone ray absorption rate of the double-sided electrode plate. For example, a difference between the double-side coating zone ray absorption rate and the blank zone ray absorption rate of the double-sided electrode plate can be used as the double-side coating ray absorption rate of the electrode plate. Then, a second-side coating ray absorption rate can be calculated through calculation based on the double-side coating ray absorption rate of the electrode plate and the first-side coating ray absorption rate, and the second-side coating ray absorption rate can be converted to obtain the second-side coating surface density.

According to the system in this embodiment of this application, the two rack scanners are disposed, each rack scanner can perform the transverse scan on the blank zone and the coated zone of the electrode plate passing through the rack scanner, so that only two rack scanners are needed to obtain the surface density measurement results through two transverse scans. This reduces the costs, reduces the influence of a difference between an environment in which the substrate uncoated is located and an environment in which the single-sided electrode plate coated is located on the measurement accuracy, and reduces the influence of a pressure difference between the substrate uncoated and the single-sided electrode plate coated on the measurement accuracy, thereby improving the accuracy of obtained surface density measurement results.

According to some embodiments of this application, optionally, one of the rack scanners is disposed at a position through which the single-sided electrode plate dried passes, and the other of the rack scanners is disposed at a position through which the double-sided electrode plate dried passes.

After the single-sided electrode plate and the double-sided electrode plate are dried, the transverse scan is performed to obtain the corresponding single-sided-electrode-plate transverse scan result and the double-sided-electrode-plate transverse scan result, and the single-sided electrode plate and the double-sided electrode plate are dried in substantially the same environment, for example, humidity and temperature, thereby ensuring that the obtained single-sided-electrode-plate transverse scan result and the double-sided-electrode-plate transverse scan result are meant for similar environments. This further reduces the influence of the environment difference between coated single-sided electrode plates and coated double-sided electrode plates on the measurement accuracy and further improves the accuracy of obtained surface density measurement results.

According to some embodiments of this application, optionally, a ray source of the rack scanner is a narrow spot ray source.

The transverse scan is performed on the single-sided electrode plate and the double-sided electrode plate by using the narrow spot ray source. Because the narrow spot ray source has a higher transverse resolution, the transverse scan result obtained by a rack scanner during the transverse scan also has a higher resolution in a transverse direction, and therefore, the surface density determined based on the result is more accurate, further improving the accuracy of obtained surface density measurement results.

According to some embodiments of this application, optionally, a width of the narrow spot ray source is smaller than a tab width of a tab of the electrode plate.

Figure 3:
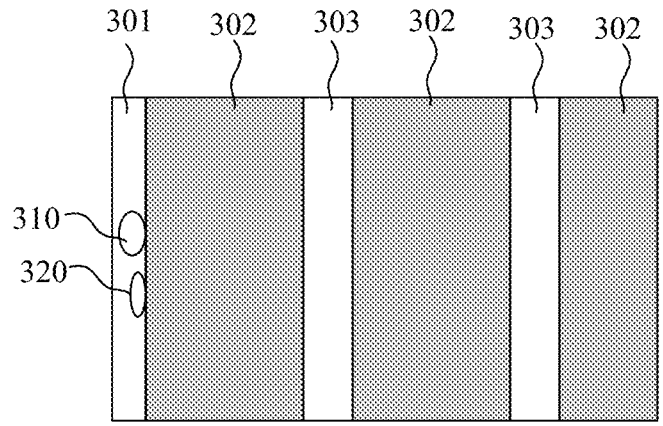
FIG. 3 is a schematic diagram of comparison between electrode plate irradiation by using a narrow spot ray source and a circular spot ray source according to some embodiments.

Refer to FIG. 3. A narrow spot ray source 320 is compared with a circular ray source 310. The width of the narrow spot ray source 320 is significantly smaller, and the width of the narrow spot ray source 320 is smaller than the tab width of the tab of the electrode plate, so that an entire light spot of a ray emitted by the narrow spot ray source 320 can fall within the range of the very narrow tab and an energy density is higher, thereby further improving the accuracy of surface density measurement. It should be understood that in the case that the width of the narrow spot ray source 320 is smaller than the tab width of the tab of the electrode plate, if a distance between the narrow spot ray source 320 and the electrode plate is large, when the ray of the narrow spot ray source 320 reaches the electrode plate, the entire ray may fall into the range of the tab or a part of the ray may exceed the range of the tab, but since the narrow spot ray source is used and has a width smaller than the tab width of the tab of the electrode plate, an energy density of the ray in the blank zone of the electrode plate is still increased, and therefore, the accuracy of surface density measurement can be improved. In actual technical implementation, the distance between the narrow spot ray source 320 and the electrode plate may also be set so that the entire light spot of the ray of the narrow spot ray source 320 can fall within the range of the tab, or a light spot formed on the electrode plate is smaller than the range of the tab when the ray of the narrow spot ray source 320 reaches the electrode plate.

With the width of the narrow spot ray source set to be smaller than the tab width of the tab of the electrode plate, it is possible for an entire light spot of the narrow spot ray source to fall within the range of the tab. The tab can be essentially considered as a blank zone of the electrode plate because the tab is not coated, and therefore, more energy of the ray source can be detected in the blank zone and a coating zone of the electrode plate, and a resolution is higher, thereby further improving the accuracy of obtained surface density measurement results.

Refer to FIG. 3. An embodiment of this application further provides a surface density measurement method. The surface density measurement method can be implemented by the surface density measurement system in the foregoing embodiments. In particular, the method includes step S101 to step S103.

Step S101. Obtain a single-sided-electrode-plate transverse scan result by performing a ray source-based transverse scan on a single-sided electrode plate, where the single-sided-electrode-plate transverse scan result includes a blank zone scan result of a blank zone of the single-sided electrode plate and a single-side coating zone scan result of the single-sided electrode plate.

Step S102. Obtain a double-sided-electrode-plate transverse scan result by performing a ray source-based transverse scan on a double-sided electrode plate, where the double-sided electrode plate is an electrode plate obtained by coating the single-sided electrode plate, and the doublesided-electrode-plate transverse scan result includes a double-side coating zone scan result of the double-sided electrode plate.

Step S103. Obtain surface densities of the electrode plate by analyzing the single-sided-electrode-plate transverse scan result and the double-sided-electrode-plate transverse scan result.

According to the method in this embodiment of this application, only a transverse scan needs to be performed on the single-sided electrode plate and the double-sided electrode plate. The single-sided-electrode-plate transverse scan result obtained in the transverse scan performed on the single-sided electrode plate includes the blank zone scan result of the blank zone of the single-sided electrode plate and the single-side coating zone scan result of the single-sided electrode plate; and the double-sided-electrode-plate transverse scan result obtained includes the double-side coating zone scan result of the double-sided electrode plate; so that the surface densities of the electrode plate are obtained by analyzing the single-sided-electrode-plate transverse scan result and the double-sided-electrode-plate transverse scan result. In other words, the surface density measurement results can be obtained from two transverse scans. This reduces the costs, reduces the influence of the difference between the environment of uncoated substrates and the environment of coated single-sided electrode plates on the measurement accuracy, and reduces the influence of a pressure difference between the substrate uncoated and the single-sided electrode plate coated on the measurement accuracy, thereby improving the accuracy of obtained surface density measurement results.

According to some embodiments of this application, optionally, the single-sided-electrode-plate transverse scan result is a result obtained by performing the transverse scan on the single-sided electrode plate dried, and the double-sided-electrode-plate transverse scan result is a result obtained by performing the transverse scan on the double-sided electrode plate dried.

After the single-sided electrode plate and the double-sided electrode plate are dried, the transverse scan is performed to obtain the corresponding single-sided-electrode-plate transverse scan result and the double-sided-electrode-plate transverse scan result, and the single-sided electrode plate and the double-sided electrode plate are dried in substantially the same environment, for example, humidity and temperature, thereby ensuring that the obtained single-sided-electrode-plate transverse scan result and the double-sided-electrode-plate transverse scan result are meant for similar environments. This further reduces the influence of the environment difference between coated single-sided electrode plates and coated double-sided electrode plates on the measurement accuracy and further improves the accuracy of obtained surface density measurement results.

According to some embodiments of this application, optionally, the single-sided-electrode-plate transverse scan result is a result obtained by performing the transverse scan on the single-sided electrode plate by using a narrow spot ray source, and the double-sided-electrode-plate transverse scan result is a result obtained by performing the transverse scan on the double-sided electrode plate by using a narrow spot ray source.

The transverse scan is performed on the single-sided electrode plate and the double-sided electrode plate by using the narrow spot ray source. Because the narrow spot ray source has a higher transverse resolution, the transverse scan result obtained by a rack scanner during the transverse scan also has a higher resolution in a transverse direction, and therefore, the surface density determined based on the result is more accurate, further improving the accuracy of obtained surface density measurement results.

According to some embodiments of this application, optionally, a width of the narrow spot ray source is smaller than a tab width of a tab of the electrode plate.

With the width of the narrow spot ray source set to be smaller than the tab width of the tab of the electrode plate, it is possible for most of a transverse part of the narrow spot ray source to fall within the range of the tab. The tab can be essentially considered as a blank zone of the electrode plate because the tab is not coated, and therefore, more energy of the ray source can be detected in the blank zone and a coating zone of the electrode plate, and a resolution is higher, thereby further improving the accuracy of obtained surface density measurement results.

Figure 4:
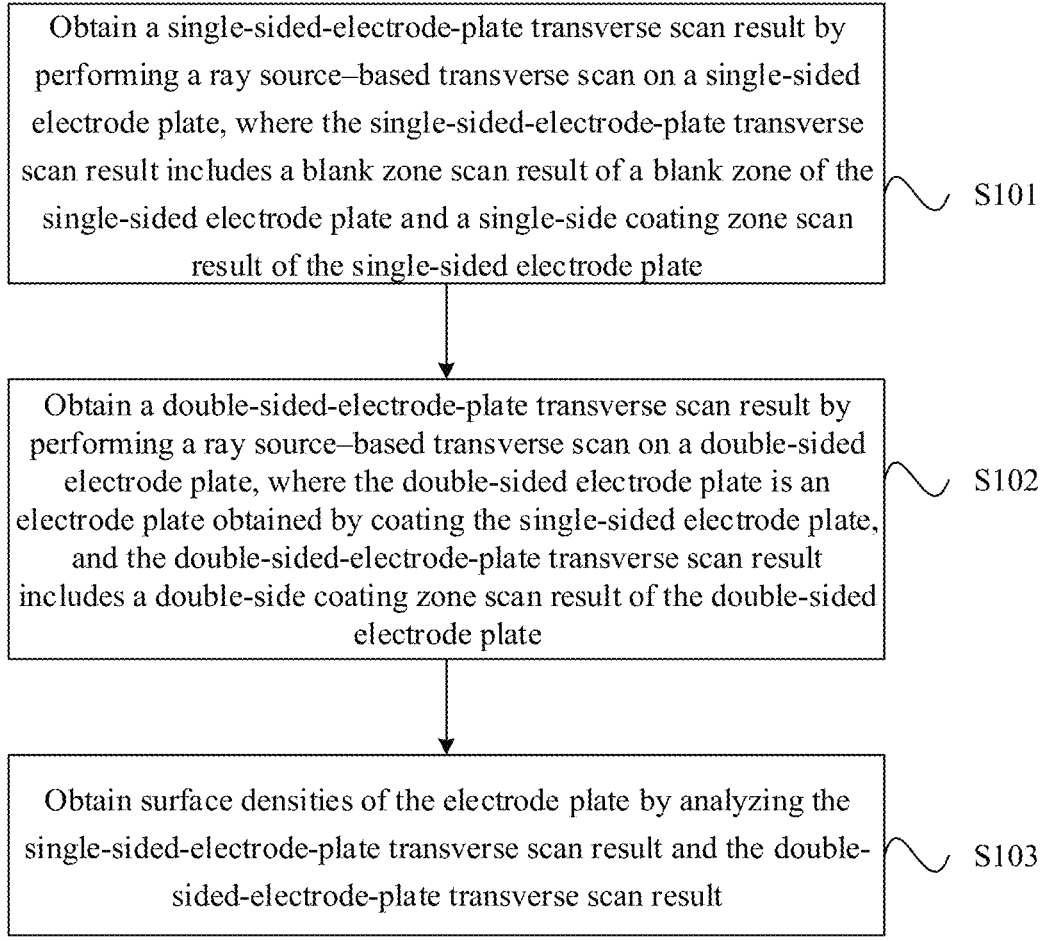
FIG. 4 is a schematic flowchart of a surface density measurement method according to some embodiments of this application.
Figure 5:
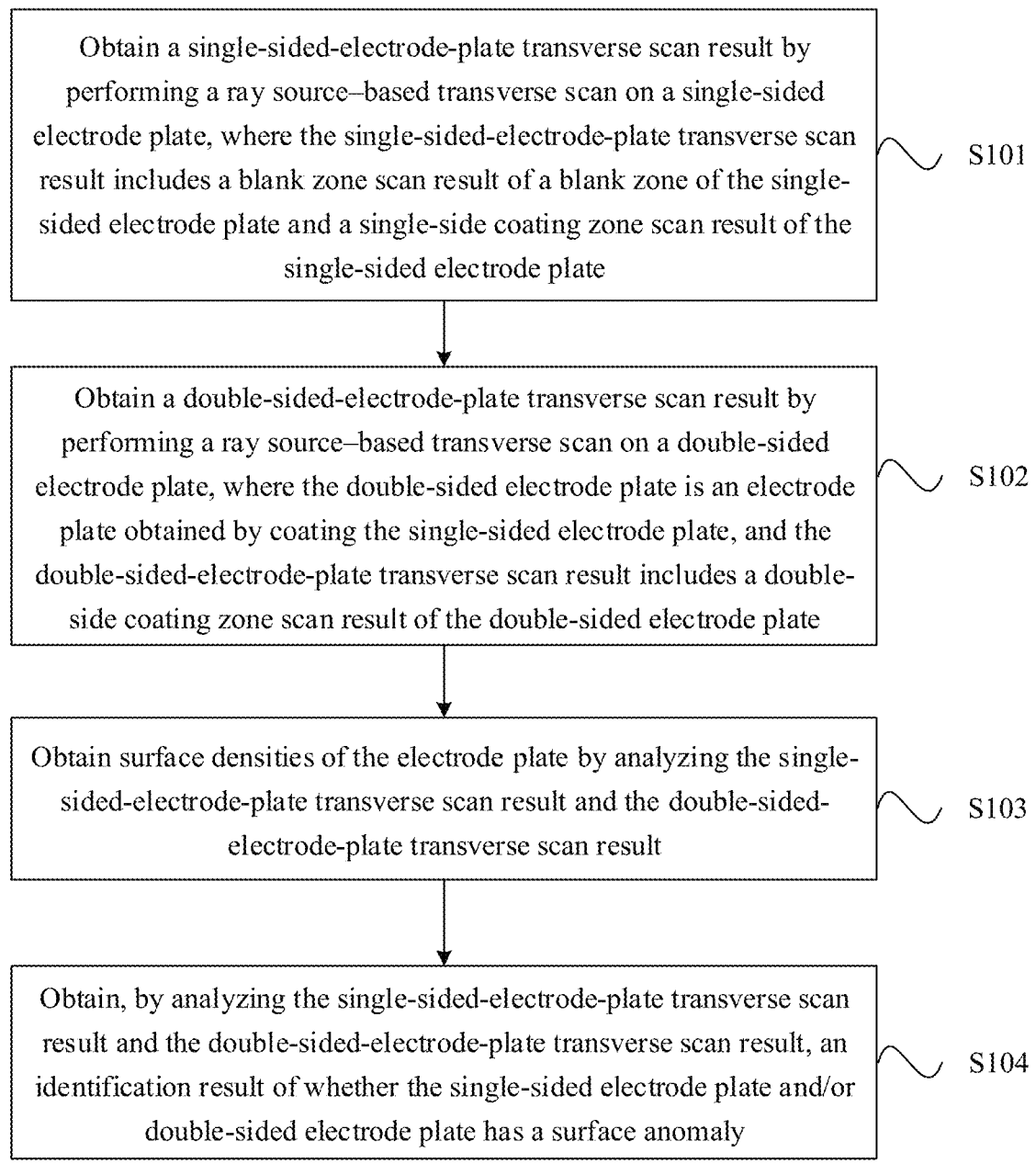
FIG. 5 is a schematic flowchart of a surface density measurement method according to some other embodiments of this application.

According to some embodiments of this application, optionally, refer to FIG. 4. The surface density measurement method may further include the following step.

Step S104. Obtain, by analyzing the single-sided-electrode-plate transverse scan result and the double-sided-electrode-plate transverse scan result, an identification result of whether the single-sided electrode plate and/or double-sided electrode plate has a surface anomaly.

Since the transverse scan is performed on the single-sided electrode plate and the double-sided electrode plate by using the narrow spot ray source and the narrow spot ray source has a higher transverse resolution, it is possible to accordingly identify whether the single-sided electrode plate and/or double-sided electrode plate has a surface anomaly, and thus the quality of the electrode plate obtained can be improved accordingly.

According to some embodiments of this application, optionally, the obtaining a single-sided-electrode-plate transverse scan result by performing a ray source-based transverse scan on a single-sided electrode plate includes:

obtaining a first scan result by performing the ray source-based transverse scan on the single-sided electrode plate;

analyzing the first scan result to identify a single-sided-electrode-plate blank zone width of a blank zone of the single-sided electrode plate and a single-side coating zone width of the single-sided electrode plate; and obtaining the single-sided-electrode-plate transverse scan result based on the first scan result, the single-sided-electrode-plate blank zone width, and the single-side coating zone width.

The analyzing the first scan result to identify a single-sided-electrode-plate blank zone width of a blank zone of the single-sided electrode plate and a single-side coating zone width of the single-sided electrode plate may be performed in a known manner of identifying the widths of various zones of an electrode plate. This is not specifically limited in the embodiments of this application.

After the first scan result is obtained by performing the ray source-based transverse scan on the single-sided electrode plate, the single-sided-electrode-plate blank zone width of the blank zone and the single-side coating zone width of the single-sided electrode plate are identified, and then based on the single-sided-electrode-plate blank zone width and single-side coating zone width identified, the specific blank zone scan result of the blank zone and the specific single-side coating zone scan result of the single-sided electrode plate can be obtained. In the case of performing the transverse scan on the single-sided electrode plate by using the narrow spot ray source, the higher transverse resolution of the narrow spot ray source can improve the capability of identifying true edge contours of substrates and coatings so that single-sided-electrode-plate blank zone widths and single-side coating zone widths identified are more accurate, thereby making the blank zone scan result of the blank zone and the single-side coating zone scan result of the single-sided electrode plate obtained accordingly also more accurate.

According to some embodiments of this application, optionally, the obtaining a double-sided-electrode-plate transverse scan result by performing a ray source-based transverse scan on a double-sided electrode plate includes:
  obtaining a second scan result by performing the ray source-based transverse scan on the double-sided electrode plate;
  analyzing the second scan result to identify a double-sided-electrode-plate blank zone width of a blank zone of the double-sided electrode plate and a double-side coating zone width of the double-sided electrode plate; and
  obtaining the double-sided-electrode-plate transverse scan result based on the second scan result, the double-sided-electrode-plate blank zone width, and the double-side coating zone width.

The analyzing the second scan result to identify a double-sided-electrode-plate blank zone width of a blank zone of the double-sided electrode plate and a double-side coating zone width of the double-sided electrode plate may be performed in a known manner of identifying the widths of various zones of an electrode plate. This is not specifically limited in the embodiments of this application.

After the second scan result is obtained by performing the ray source-based transverse scan on the double-sided electrode plate, the double-sided-electrode-plate blank zone width of the blank zone and the double-side coating zone width of the double-sided electrode plate are identified, and then based on the double-sided-electrode-plate blank zone width and double-side coating zone width identified, the specific blank zone scan result of the blank zone and the specific double-side coating zone scan result of the double-sided electrode plate can be obtained. In the case of performing the transverse scan on the double-sided electrode plate by using the narrow spot ray source, the higher transverse resolution of the narrow spot ray source can improve the capability of identifying true edge contours of substrates and coatings so that double-sided-electrode-plate blank zone widths and double-side coating zone widths identified are more accurate, thereby making the blank zone scan result of the blank zone and the double-side coating zone scan result of the double-sided electrode plate obtained accordingly also more accurate.

According to some embodiments of this application, optionally, obtaining surface density measurement results of the electrode plate by analyzing the single-sided-electrode-plate transverse scan result and the double-sided-electrode-plate transverse scan result includes:
  obtaining a substrate surface density and first-side coating surface density of the electrode plate by analyzing the single-sided-electrode-plate transverse scan result; and
  obtaining a second-side coating surface density of the electrode plate by analyzing the single-sided-electrode-plate transverse scan result and the double-sided-electrode-plate transverse scan result.

The substrate surface density and first-side coating surface density of the electrode plate can be obtained from the single-sided-electrode-plate transverse scan result; and the second-side coating surface density of the electrode plate can be obtained with reference to the single-sided-electrode-plate transverse scan result and the double-sided-electrode-plate transverse scan result, so that the surface densities of the substrate, a first surface coating, and a second surface coating of the electrode plate are determined.

According to some embodiments of this application, optionally, the blank zone scan result of the blank zone of the single-sided electrode plate includes a blank zone ray absorption rate of the blank zone of the single-sided electrode plate, and the single-side coating zone scan result of the single-sided electrode plate includes a single-side coating zone ray absorption rate of the single-sided electrode plate.

In this case, the obtaining a substrate surface density and first-side coating surface density of the single-sided electrode plate by analyzing the single-sided-electrode-plate transverse scan result includes:
  obtaining a first-side coating ray absorption rate based on the blank zone ray absorption rate and the single-side coating zone ray absorption rate, and
  obtaining the first-side coating surface density based on the first-side coating ray absorption rate through conversion.

The first-side coating surface density can be obtained based on the obtained blank zone ray absorption rate of the blank zone of the single-sided electrode plate, the single-side coating zone ray absorption rate of the single-sided electrode plate, and conversion relations between absorption rates and surface densities.

According to some embodiments of this application, optionally, the double-side coating zone scan result includes a double-side coating zone ray absorption rate of the double-sided electrode plate; and
  the obtaining a second-side coating surface density of the double-sided electrode plate by analyzing the single-sided-electrode-plate transverse scan result and the double-sided-electrode-plate transverse scan result includes:
  obtaining a second-side coating ray absorption rate based on the single-side coating zone ray absorption rate and the double-side coating zone ray absorption rate, and
  obtaining the second-side coating surface density based on the second-side coating ray absorption rate through conversion.

The second-side coating surface density can be obtained based on the obtained double-side coating zone ray absorption rate of the double-sided electrode plate and conversion relations between absorption rates and surface densities.

According to some embodiments of this application, this application provides a surface density measurement system and a surface density measurement method implemented by the surface density measurement system. Refer to FIG. 2. The system includes two rack scanners 201, 202. The rack scanner 201 is disposed at a location through which a single-sided electrode plate passes, and the rack scanner 202 is disposed at a location through which a double-sided electrode plate passes. During moving of a substrate 10 towards a coater, the substrate 10 is coated on one side to obtain the single-sided electrode plate, which is dried by a drying device 20 and then passes through the rack scanner 201, and the rack scanner 201 performs a ray scan on the single-sided electrode plate. Then, the other side uncoated of the single-sided electrode plate dried is coated to obtain a double-sided electrode plate, the double-sided electrode plate is dried by a drying device and then passes through the rack scanner 202, and the rack scanner 202 performs a ray scan on the double-sided electrode plate.

Source windows of radiation sources of the rack scanners 201, 202 are smaller in size than conventional source windows, to reduce the size of a light spot of a ray emitted so that the entire light spot of the ray emitted can fall into the range of the tab of the electrode plate, so as to improve the detection resolution and further improve the measurement accuracy. That is, the radiation sources of the rack scanners 201, 202 are narrow spot radiation sources With the narrow spot radiation source used, the measurement resolution is improved, and in addition, it is possible to use one test apparatus to test surface densities of substrates and film-applied zones (film-applied zones of single-sided electrode plates or double-sided electrode plates) and synchronously measure the substrates and the film-applied zones, thereby improving the use efficiency of the device.

In an example, during coating production of lithium batteries, a transverse scan speed is 200 millimeters per second (mm/s) and an integration response time of a detector is 0.05 seconds (s). When a transverse width of a light spot of an emission source is 20 millimeters (mm), a width of valid data for determining surface density is equal to a tab width of a substrate minus a spot size and an offset size. In some embodiments, the offset size is 10 mm. It should be understood that a higher transverse scan speed means a larger offset size. In this case, for example, if the offset size is 10 mm, the tab width needs to be larger, for example, greater than or equal to 30 mm. However, in the actual production process of lithium batteries, the tab width is narrow. Therefore, a narrow light spot is used to implement surface density measurement so as to implement surface density measurement for very narrow tabs.

The rack scanner 201 obtains a first scan result by performing a narrow spot ray source-based transverse scan on the single-sided electrode plate; analyzes the first scan result to identify a single-sided-electrode-plate blank zone width of a blank zone of the single-sided electrode plate and a single-side coating zone width of the single-sided electrode plate; and obtains the single-sided-electrode-plate transverse scan result based on the first scan result, the single-sided-electrode-plate blank zone width, and the single-side coating zone width, that is, obtains the blank zone scan result of the blank zone of the single-sided electrode plate and the single-side coating zone scan result of the single-sided electrode plate.

The rack scanner 202 obtains a second scan result by performing a narrow spot ray source-based transverse scan on the double-sided electrode plate; analyzes the second scan result to identify a double-sided-electrode-plate blank zone width of a blank zone of the double-sided electrode plate and a double-side coating zone width of the double-sided electrode plate; and obtains the double-sided-electrode-plate transverse scan result, that is, obtains the double-side coating zone scan result of the double-sided electrode plate, based on the second scan result, the double-sided-electrode-plate blank zone width, and the double-side coating zone width, and may further obtain the blank zone scan result of the blank zone of the double-sided electrode plate.

For example, in obtaining the surface density through conversion based on the ray absorption rate, the substrate surface density of the substrate can be obtained through conversion based on the blank zone ray absorption rate of the blank zone of the single-sided electrode plate obtained through the scan. The first-side coating ray absorption rate is obtained based on the blank zone ray absorption rate and single-side coating zone ray absorption rate of the single-sided electrode plate. The first-side coating surface density is obtained through conversion based on the first-side coating ray absorption rate. Then, the second-side coating ray absorption rate is obtained based on the single-side coating zone ray absorption rate and the double-side coating zone ray absorption rate. The second-side coating surface density is obtained through conversion based on the second-side coating ray absorption rate.

In some embodiments, the conversion can be performed in combination with the following relation between ray absorption rate and surface density:

$$R = \frac{I}{I_0} = e^{-\lambda m},$$

where

R denotes a ray penetration rate, I denotes a current signal obtained during substance penetration, to be specific, a current signal received by a receive end of the rack scanner in a case that a ray passes through the electrode plate in this embodiment of this application, $I_0$ denotes a current signal obtained during air penetration, to be specific, a current signal received by the receive end of the rack scanner in a case that a ray does not pass through the electrode plate or no another object is present between a transmit end and the receive end of the rack scanner, λ indicates an absorption coefficient, and $m$ indicates a substance surface density.

The foregoing formula is converted and a final converted-to substance surface density can be expressed as:

$$m = \frac{1}{\lambda} \ln\left(\frac{I_0}{I}\right).$$

Further, since the narrow spot emission source is used and the emission source has a high resolution, a surface density value of a thinned zone at the edge of the film zone can be accurately identified, and it is also possible to detect undesirable abnormalities such as bumpy spots, pinholes, and scratches present on the sheet.

It should be understood that although the steps of the flowchart in the foregoing embodiments are shown sequentially as indicated by the arrows, these steps are not necessarily performed sequentially in the order indicated by the arrows. Unless otherwise specified explicitly, execution of these steps is not limited to a strict order, and the steps may be executed in another order. Moreover, at least some of the steps of the flowchart in the foregoing embodiments may include multiple steps or multiple stages. These steps or stages are not necessarily performed at a same time but may be performed at different times, and these steps or stages are not necessarily performed in a sequential order either but may be performed in a sequential or alternating manner with at least some of other steps or steps or stages in other steps.

Based on the same inventive concept, an embodiment of this application further provides a surface density measurement apparatus for implementing the surface density measurement method in the foregoing embodiments. The problem-solving implementation scheme provided by the apparatus is similar to the implementation scheme recorded in the foregoing method. Therefore, for specific limitations in one or more embodiments of the surface density measurement apparatus provided below, refer to the limitations in the foregoing surface density measurement method. Details are not repeated herein.

Figure 6:
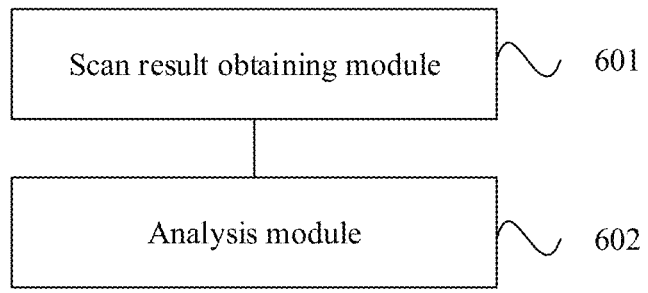
FIG. 6 is a structural block diagram of a surface density measurement apparatus according to some embodiments of this application.

According to some embodiments of this application, refer to FIG. 6. A surface density measurement apparatus is provided. The apparatus includes a scan result obtaining module 601 and an analysis module 602.

The scan result obtaining module 601 is configured to obtain a single-sided-electrode-plate transverse scan result by performing a ray source-based transverse scan on a single-sided electrode plate, where the single-sided-electrode-plate transverse scan result includes a blank zone scan result of a blank zone of the single-sided electrode plate and a single-side coating zone scan result of the single-sided electrode plate; and obtain a double-sided-electrode-plate transverse scan result by performing a ray source-based transverse scan on a double-sided electrode plate, where the double-sided electrode plate is an electrode plate obtained by coating the single-sided electrode plate, and the double-sided-electrode-plate transverse scan result includes a double-side coating zone scan result of the double-sided electrode plate; and the analysis module 602 is configured to obtain surface densities of the electrode plate by analyzing the single-sided-electrode-plate transverse scan result and the double-sided-electrode-plate transverse scan result.

According to some embodiments of this application, optionally, the single-sided-electrode-plate transverse scan result is a result obtained by performing the transverse scan on the single-sided electrode plate dried, and the double-sided-electrode-plate transverse scan result is a result obtained by performing the transverse scan on the double-sided electrode plate dried.

According to some embodiments of this application, optionally, the single-sided-electrode-plate transverse scan result is a result obtained by performing the transverse scan on the single-sided electrode plate by using a narrow spot ray source, and the double-sided-electrode-plate transverse scan result is a result obtained by performing the transverse scan on the double-sided electrode plate by using a narrow spot ray source.

According to some embodiments of this application, optionally, a width of the narrow spot ray source is smaller than a tab width of a tab of the electrode plate.

According to some embodiments of this application, optionally, the analysis module 602 is further configured to obtain, by analyzing the single-sided-electrode-plate transverse scan result and the double-sided-electrode-plate transverse scan result, an identification result of whether the single-sided electrode plate and/or double-sided electrode plate has a surface anomaly.

According to some embodiments of this application, optionally, the scan result obtaining module 601 is configured to obtain a first scan result by performing the ray source-based transverse scan on the single-sided electrode plate; analyze the first scan result to identify a single-sided-electrode-plate blank zone width of a blank zone of the single-sided electrode plate and a single-side coating zone width of the single-sided electrode plate; and obtain the single-sided-electrode-plate transverse scan result based on the first scan result, the single-sided-electrode-plate blank zone width, and the single-side coating zone width.

According to some embodiments of this application, optionally, the scan result obtaining module 601 is configured to obtain a second scan result by performing the ray source-based transverse scan on the double-sided electrode plate; analyze the second scan result to identify a double-sided-electrode-plate blank zone width of a blank zone of the double-sided electrode plate and a double-side coating zone width of the double-sided electrode plate; and obtain the double-sided-electrode-plate transverse scan result based on the second scan result, the double-sided-electrode-plate blank zone width, and the double-side coating zone width.

All or some of the modules in the foregoing surface density measurement apparatus may be implemented by software, hardware, or a combination thereof. Each of the foregoing modules may be embedded as hardware into or independent of a processor in a computer device, or may be stored as software in a memory in a computer device for ease of being called by a processor to perform the foregoing operations corresponding to each module.

Figure 7:
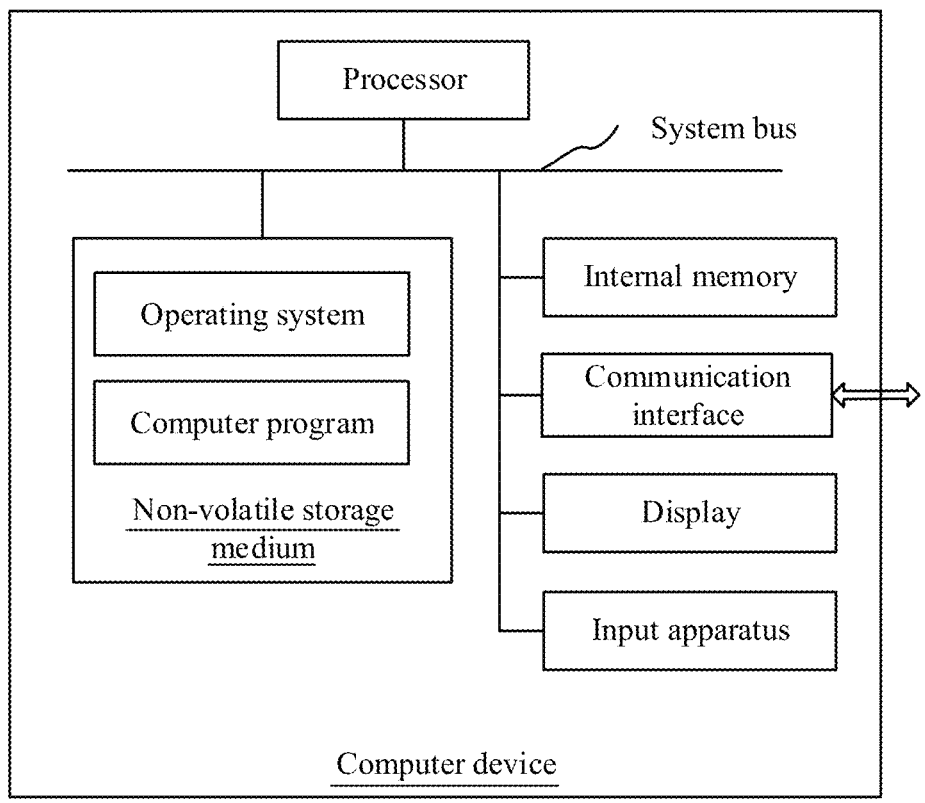
FIG. 7 is a structural block diagram of a computer device according to some other embodiments of this application.

In an embodiment, a computer device is provided. The computer device may be a terminal whose internal structure may be illustrated in FIG. 7. The computer device includes a processor, a memory, a communication interface, a display, and an input apparatus that are connected via a system bus. The processor is configured to provide computing and control capabilities. Memories of the computer device include a non-volatile storage medium and an internal memory. The non-volatile storage medium stores an operating system and a computer program. The internal memory provides an environment for the operation of the operating system and computer program in the non-volatile storage medium. The communication interface of the computer device is configured to communicate with an external terminal in a wired or wireless manner. The wireless manner can be implemented through Wi-Fi, a carrier network, NFC (near field communication), or other technologies. When the computer program is executed by the processor, the surface density measurement method in the foregoing embodiments is implemented. The display of the computer device may be a liquid crystal display or an electronic ink display. The input apparatus of the computer device may be a touch layer overlaid on the display, or a button, trackball, or trackpad provided on a housing of the computer device, or an external keyboard, trackpad, mouse, or the like.

In an embodiment, a computer device is further provided and includes a memory and a processor. The memory stores a computer program, and when the processor executes the computer program, the steps of the surface density measurement method in any one of the foregoing embodiments are implemented.

In an embodiment, computer-readable storage medium is provided and stores a computer program, and when the computer program is executed by a processor, the steps of the surface density measurement method in any one of the foregoing embodiments are implemented.

In an embodiment, a computer program product or computer program is provided. The computer program product or computer program includes computer instructions. The computer instructions are stored in a computer-readable storage medium. A processor of a computer device reads the computer instructions from the computer-readable storage medium, and the processor executes the computer instructions such that the computer device performs the steps of the surface density measurement method of any one of the foregoing embodiments.

Persons of ordinary skill in the art can understand that all or part of the processes of the method in the embodiments may be implemented by a computer program instructing related hardware. The computer program may be stored in a non-volatile computer-readable storage medium, and when the computer program is executed, the processes in the foregoing method embodiments may be included. Any reference to a memory, storage, database, or another medium used and provided in the embodiments of this application may include at least one of non-volatile or volatile memories. The non-volatile memory may include read-only memory (Read-Only Memory, ROM), magnetic tape, floppy disk, flash memory, optical memory, or the like. The volatile memory may include random access memory (Random Access Memory, RAM) or external cache memory. As an illustration but not a limitation, the RAM can take various forms, such as static random access memory (Static Random Access Memory, SRAM) or dynamic random access memory (Dynamic Random Access Memory, DRAM).

In conclusion, it should be noted that the above embodiments are merely intended for describing the technical solutions of this application but not for limiting this application. Although this application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this application. They should all be covered in the scope of the claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A surface density measurement method, comprising:
   obtaining a single-sided-electrode-plate transverse scan result by performing a ray source-based transverse scan on a single-sided electrode plate, wherein the single-sided-electrode-plate transverse scan result comprises a blank zone scan result of a blank zone of the single-sided electrode plate and a single-side coating zone scan result of the single-sided electrode plate;
   obtaining a double-sided-electrode-plate transverse scan result by performing a ray source-based transverse scan on a double-sided electrode plate, wherein the double-sided electrode plate is an electrode plate obtained by coating the single-sided electrode plate, and the double-sided-electrode-plate transverse scan result comprises a double-side coating zone scan result of the double-sided electrode plate; and
   obtaining surface densities of the electrode plate by analyzing the single-sided-electrode-plate transverse scan result and the double-sided-electrode-plate transverse scan result.

2. The method according to claim 1, wherein the single-sided-electrode-plate transverse scan result is a result obtained by performing a transverse scan on the single-sided electrode plate dried, and the double-sided-electrode-plate transverse scan result is a result obtained by performing the transverse scan on the double-sided electrode plate dried.

3. The method according to claim 1, wherein the single-sided-electrode-plate transverse scan result is a result obtained by performing a transverse scan on the single-sided electrode plate by using a narrow spot ray source, and the double-sided-electrode-plate transverse scan result is a result obtained by performing the transverse scan on the double-sided electrode plate by using a narrow spot ray source.

4. The method according to claim 3, wherein a width of the narrow spot ray source is smaller than a tab width of a tab of the electrode plate.

5. The method according to claim 1, further comprising:
   obtaining, by analyzing the single-sided-electrode-plate transverse scan result and the double-sided-electrode-plate transverse scan result, an identification result of whether the single-sided electrode plate and/or double-sided electrode plate has a surface anomaly.

6. The method according to claim 1, wherein obtaining the single-sided-electrode-plate transverse scan result by performing the ray source-based transverse scan on the single-sided electrode plate comprises:
   obtaining a first scan result by performing the ray source-based transverse scan on the single-sided electrode plate;
   analyzing the first scan result to identify a single-sided-electrode-plate blank zone width of a blank zone of the single-sided electrode plate and a single-side coating zone width of the single-sided electrode plate; and
   obtaining the single-sided-electrode-plate transverse scan result based on the first scan result, the single-sided-electrode-plate blank zone width, and the single-side coating zone width.

7. The method according to claim 1, wherein obtaining the double-sided-electrode-plate transverse scan result by performing the ray source-based transverse scan on the double-sided electrode plate comprises:
   obtaining a second scan result by performing the ray source-based transverse scan on the double-sided electrode plate;
   analyzing the second scan result to identify a double-sided-electrode-plate blank zone width of a blank zone of the double-sided electrode plate and a double-side coating zone width of the double-sided electrode plate; and
   obtaining the double-sided-electrode-plate transverse scan result based on the second scan result, the double-sided-electrode-plate blank zone width, and the double-side coating zone width.

8. A computer device comprising:
   a processor; and
   a memory storing a computer program that, when executed by the processor, enables the processor to perform the method according to claim 1.

9. A non-transitory computer-readable storage medium storing a computer program that, when executed by a processor, enables the processor to perform the method according to claim 1.

10. A surface density measurement system, comprising:
    two rack scanners;
    wherein one of the rack scanners is disposed at a position through which a single-sided electrode plate passes, another of the rack scanners is disposed at a position through which a double-sided electrode plate passes, the double-sided electrode plate is an electrode plate obtained by coating the single-sided electrode plate, each of the rack scanners performs a transverse scan on a blank zone and a coated zone of the electrode plate passing through the rack scanner, and surface densities of the electrode plate are obtained based on the transverse scan results of the two rack scanners.

11. The system according to claim 10, wherein one of the rack scanners is disposed at a position through which the single-sided electrode plate dried passes, and the other of the rack scanners is disposed at a position through which the double-sided electrode plate dried passes.

12. The system according to claim 10, wherein a ray source of the rack scanner is a narrow spot ray source.

13. The system according to claim 12, wherein a width of the narrow spot ray source is smaller than a tab width of a tab of the electrode plate.

* * * * *